(12) United States Patent
Matoba et al.

(10) Patent No.: US 8,530,587 B2
(45) Date of Patent: Sep. 10, 2013

(54) VULCANIZABLE RUBBER COMPOSITION FOR USE IN AN AIR SPRING AND RUBBER FORMED PRODUCT FOR USE IN AN AIR SPRING

(75) Inventors: Yasuo Matoba, Osaka (JP); Tadahiro Ono, Osaka (JP); Motoki Kitagawa, Osaka (JP)

(73) Assignee: Daiso Co., Ltd, Osaka (JP)

( * ) Notice: Subject to any disclaimer, the term of this patent is extended or adjusted under 35 U.S.C. 154(b) by 242 days.

(21) Appl. No.: 13/060,264

(22) PCT Filed: Mar. 12, 2009

(86) PCT No.: PCT/JP2009/054799
§ 371 (c)(1),
(2), (4) Date: Feb. 22, 2011

(87) PCT Pub. No.: WO2010/021169
PCT Pub. Date: Feb. 25, 2010

(65) Prior Publication Data
US 2011/0160342 A1    Jun. 30, 2011

(30) Foreign Application Priority Data

Aug. 22, 2008 (JP) .................................. 2008-214111
Feb. 4, 2009 (JP) .................................. 2009-023992

(51) Int. Cl.
*C08G 65/338* (2006.01)
*C08G 65/333* (2006.01)
*C08G 65/334* (2006.01)
*C08L 71/03* (2006.01)

(52) U.S. Cl.
USPC .................. 525/403; 524/86; 524/87; 524/99; 524/100; 524/210; 524/211; 524/392; 524/436; 524/437

(58) Field of Classification Search
USPC ...................... 525/403; 524/7, 80, 81, 86, 87, 524/99, 100, 186, 210, 211, 392, 394, 401, 524/424, 425, 430, 431, 432, 433, 436, 437
See application file for complete search history.

(56) References Cited

U.S. PATENT DOCUMENTS

| | | | | |
|---|---|---|---|---|
| 4,061,612 A * | 12/1977 | Bertozzi et al. | ............... | 524/290 |
| 5,519,079 A | 5/1996 | Tomoshige et al. | | |
| 8,258,222 B2 * | 9/2012 | Otaka et al. | .................. | 524/322 |
| 8,283,039 B2 * | 10/2012 | Funayama et al. | ............ | 428/413 |
| 2004/0248485 A1 | 12/2004 | Kerstetter, III | | |
| 2006/0128857 A1 | 6/2006 | Otaka et al. | | |
| 2006/0216518 A1 | 9/2006 | Funayama et al. | | |
| 2011/0160344 A1 * | 6/2011 | Shoji et al. | ..................... | 523/453 |
| 2011/0210296 A1 * | 9/2011 | Yasuda et al. | ............ | 252/519.33 |
| 2012/0208966 A1 * | 8/2012 | Ohnuki et al. | ................ | 525/404 |

FOREIGN PATENT DOCUMENTS

| | | |
|---|---|---|
| CN | 1836897 A | 3/2006 |
| EP | 2 083 048 A1 | 7/2009 |
| JP | 60147450 A * | 8/1985 |
| JP | 07-157566 | 6/1995 |
| JP | 1999-082739 | 3/1999 |
| JP | 2002-121532 | 4/2002 |
| JP | 2003-155409 | 5/2003 |
| JP | 2004-143299 | 5/2004 |
| JP | 2004-360894 | 12/2004 |
| JP | 2006-176763 | 7/2006 |
| JP | 2006-282693 | 10/2006 |
| JP | 2007-186564 | 7/2007 |
| JP | 2008-132641 | 6/2008 |
| WO | WO 2008/050859 | 5/2008 |

OTHER PUBLICATIONS

Translation of JP 60147450 A, provided the USPTO translations branch (no date).*
Office Action dated Jan. 12, 2012 in Chinese Application No. 200980132888.1.
International Search Report; Application No. PCT/JP2009/054799; May 18, 2009.
Office Action mailed Oct. 8, 2012 in corresponding Chinese patent Application No. 200980132888.1.

* cited by examiner

*Primary Examiner* — Michael J Feely
(74) *Attorney, Agent, or Firm* — Knobbe Martens Olson & Bear LLP

(57) ABSTRACT

Disclosed is a vulcanizable rubber composition for use in an air spring, which has excellent low-temperature behavior, and a vulcanized rubber formed product for air springs, which is obtained by vulcanization of the rubber composition. Also disclosed is a vulcanizable rubber composition for use in an air spring, comprising: an epihalohydrin-based copolymer comprising 50 to 70 mol % of a constituent unit derived from ethylene oxide and/or propylene oxide, 20 to 50 mol % of a constituent unit derived from epihalohydrin, and 0 to 15 mol % of a constituent unit derived from allyl glycidyl ether; a vulcanizing agent; a plasticizer; and an acid acceptor, and a rubber formed product for air springs, which is obtained by vulcanization of the composition.

6 Claims, No Drawings

VULCANIZABLE RUBBER COMPOSITION FOR USE IN AN AIR SPRING AND RUBBER FORMED PRODUCT FOR USE IN AN AIR SPRING

CROSS-REFERENCE TO RELATED APPLICATIONS

This application is the U.S. National Phase under 35. U.S.C. §371 of International Application PCT/JP2009/054799, filed Mar. 12, 2009, which claims priority to Japanese Patent Application No. 2008-214111, filed Aug. 22, 2008, and Japanese Patent Application No. 2009-023992, filed Feb. 4, 2009. The International Application was published under PCT Article 21 (2) in a language other than English.

TECHNICAL FIELD

The invention relates to a vulcanizable rubber composition for air springs for use in such applications as air suspensions for railway vehicles, a variety of industrial equipment, and automobiles (such as cars, trucks, and buses), and to a rubber formed product for air springs, which is obtained by vulcanization of the composition.

BACKGROUND ART

Conventional rubber materials for air spring rubber compositions for use in such applications as air suspensions for railway vehicles, a variety of industrial equipment, and automobiles (such as cars, trucks, and buses) include natural rubber, butyl rubber, and chloroprene rubber. When resistance to flex fatigue is only required, natural rubber is generally used for rubber compositions for air springs. On the other hand, when prevention of ozone-induced cracking, oil resistance, or heat resistance is required, butyl rubber, chloroprene rubber, or a rubber blend of chloroprene rubber and natural rubber is used depending on the service conditions (see Patent Documents 1 and 2).

However, butyl rubber and chloroprene rubber are embrittled under a low-temperature environment, and therefore, there has been a demand for an air spring rubber composition having high versatility, weather resistance including low-temperature characteristic, resistance to flex fatigue, and ozone resistance.
Patent Document 1: JP-A-11-82739
Patent Document 2: JP-A-2008-132641

DISCLOSURE OF THE INVENTION

Problem to be Solved by the Invention

It is therefore an object of the invention to provide an air spring rubber composition not only having resistance to flex fatigue and ozone resistance but also exhibiting excellent low-temperature behavior to prevent embrittlement even under a low-temperature environment, and to provide a vulcanized rubber formed product for air springs, which is obtained by vulcanization of the rubber composition.

Means for Solving the Problems

As a result of investigation to solve the problems, the inventors have accomplished the invention based on the finding that the problems can be solved using a specific vulcanizable rubber composition for air springs, which contains a specific epihalohydrin-based copolymer, a vulcanizing agent, a plasticizer, and an acid acceptor.

That is, the vulcanizable rubber composition for use in an air spring of the invention comprises an epihalohydrin-based copolymer comprising 30 to 70 mol % of a constituent unit represented by formula (I):

[formula (I)]

and/or formula (II):

[formula (II)]

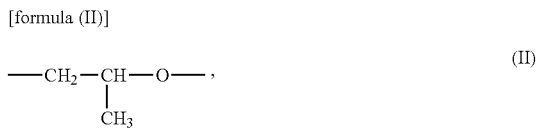

20 to 70 mol % of a constituent unit represented by formula (III):

[formula (III)]

wherein X represents a halogen atom selected from chlorine, bromine, and iodine, and 0 to 15 mol % of a constituent unit represented by formula (IV):

[formula (IV)]

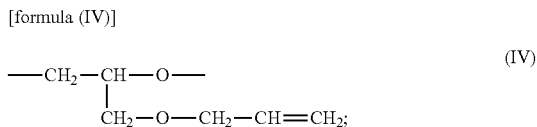

a vulcanizing agent; a plasticizer; and an acid acceptor.

It is preferred that the epihalohydrin-based copolymer comprises 50 to 70 mol % of the constituent unit represented by formula (I) and/or formula (II), 20 to 50 mol % of the constituent unit represented by formula (III), and 0 to 15 mol % of the constituent unit represented by formula (IV).

It is preferred that the plasticizer has a freezing point of −40° C. or lower.

It is preferred that the vulcanizing agent is at least one selected from the group consisting of a triazine-based vulcanizing agent, a quinoxaline-based vulcanizing agent, a thiourea-based vulcanizing agent, and a sulfur-containing vulcanizing agent, it is more preferred that the vulcanizing agent is the quinoxaline-based vulcanizing agent, and it is still more preferred that 6-methylquinoxaline-2,3-dithiocarbonate.

It is preferred that the inorganic microporous crystal is at least one selected from the group consisting of synthetic hydrotalcite, a Li—Al clathrate compound, and synthetic zeolite.

It is preferred that the rubber formed product for use in an air spring of the invention comprises the vulcanization product of the rubber composition.

In an embodiment of the invention, the vulcanizable rubber composition for use in an air spring contains an epihalohydrin-based copolymer comprising 30 to 70 mol % of a constituent unit derived from ethylene oxide and/or propylene oxide, 20 to 70 mol % of a constituent unit derived from epihalohydrin, and 0 to 15 mol % of a constituent unit derived from allyl glycidyl ether; a vulcanizing agent; a plasticizer; and an acid acceptor. Therefore, an air spring rubber formed product obtained by vulcanization of the vulcanizable rubber composition of the invention has resistance to flex fatigue and ozone resistance, which are generally required of air spring rubber formed products, and also has satisfactory low-temperature properties. In particular, the use of an epihalohydrin-based copolymer comprising 50 to 70 mol % of a constituent unit derived from ethylene oxide and/or propylene oxide, 20 to 50 mol % of a constituent unit derived from epihalohydrin, and 0 to 15 mol % of a constituent unit derived froth allyl glycidyl ether makes it possible to produce an air spring rubber formed product exhibiting excellent low-temperature behavior.

EMBODIMENTS FOR CARRYING OUT THE INVENTION

The features of the invention are described in detail below.

Vulcanizable Rubber Composition for Use in Air Spring

The vulcanizable rubber composition of the invention for use in an air spring is directed to a rubber composition to be vulcanized, which comprises at least an epihalohydrin-based copolymer, a vulcanizing agent, an acid acceptor, and a plasticizer.

Epihalohydrin-Based Copolymer

The epihalohydrin-based copolymer for use in an embodiment of the invention comprises 30 to 70 mol % of a constituent unit represented by formula (I) and/or formula (II), 20 to 70 mol % of a constituent unit represented by formula (III), and 0 to 15 mol % of a constituent unit represented by formula (IV).

In the epihalohydrin-based copolymer for use in an embodiment of the in invention, the compound from which the constituent unit represented by formula (I) and/or formula (II) is derived is preferably ethylene oxide and/or propylene oxide, the content of which is from 30 to 70 mol %, preferably from 50 to 70 mol %. If the content of the constituent represented by formula (I) and/or formula (II) is less than 30 mol %, the epihalohydrin-based copolymer may undesirably have insufficient low-temperature properties, and if it is more than 70 mol %, the epihalohydrin-based copolymer may undesirably be reduced in resistance to flex fatigue and have low vulcanizing rate.

In the epihalohydrin-based copolymer for use in an embodiment of the in invention, the compound from which the constituent represented by formula (III) is derived is preferably epihalohydrin, the content of which is from 20 to 70 mol %, preferably from 20 to 50 mol % in view of low-temperature properties and resistance to flex fatigue, depending on the content of the constituent unit represented by formula (I) and/or formula (II).

In the epihalohydrin-based copolymer for use in an embodiment of the in invention, the compound from which the constituent represented by formula (IV) is derived is preferably allyl glycidyl ether, and the presence of the constituent makes it possible to improve ozone resistance. Therefore, the content of the constituent unit represented by formula (IV) in the epihalohydrin-based copolymer is from 0 to 15 mol %, preferably from 3 to 13 mol %.

In view of rubber material processability, the molecular weight of the epihalohydrin-based copolymer for use in an embodiment of the in invention is preferably such that the epihalohydrin-based copolymer has a Mooney viscosity ($ML_{1+4}$) in the range of 5 to 200, more preferably in the range of 30 to 150, as measured at 100° C. by the method according to JIS K 6300-1. If the Mooney viscosity is out of the range, the material may be undesirably difficult to process.

The epihalohydrin-based copolymer having a Mooney viscosity in the above range may be produced by a solution polymerization method or a slurry polymerization method at a temperature in the range of −20 to 100° C. using a catalyst capable of catalyzing ring-opening polymerization of oxirane compounds.

Examples of the catalyst include a catalytic system obtained by reaction of an organoaluminum as a main material with water, an oxo compound of phosphorus, or acetyl acetone; a catalytic system obtained by reaction of an organozinc as a main material with water; and an organotin-phosphoric ester condensate catalytic system. For example, the organotin-phosphoric ester condensate catalytic system described in U.S. Pat. No. 3,773,694 may be used for the production of polyether multi-component copolymers.

Examples of the epihalohydrin-based copolymer include an epichlorohydrin-ethylene oxide copolymer, an epibromohydrin-ethylene oxide copolymer, an epichlorohydrin-propylene oxide copolymer, an epibromohydrin-propylene oxide copolymer, an epichlorohydrin-ethylene oxide-propylene oxide ternary copolymer, an epibromohydrin-ethylene oxide-propylene oxide ternary copolymer, an epichlorohydrin-ethylene oxide-allyl glycidyl ether ternary copolymer, an epichlorohydrin-propylene oxide-allyl glycidyl ether ternary copolymer, an epibromohydrin-ethylene oxide-allyl glycidyl ether ternary copolymer, an epibromohydrin-propylene oxide-allyl glycidyl ether ternary copolymer, an epichlorohydrin-ethylene oxide-propylene oxide-allyl glycidyl ether quaternary copolymer, and an epibromohydrin-ethylene oxide-propylene oxide-allyl glycidyl ether quaternary copolymer. These copolymers may be used singly or in combination of two or more.

The epihalohydrin-based copolymer for use in an embodiment of the invention is preferably an epichlorohydrin-ethylene oxide copolymer, an epichlorohydrin-propylene oxide copolymer, an epichlorohydrin-ethylene oxide-propylene oxide ternary copolymer, an epichlorohydrin-ethylene oxide-allyl glycidyl ether ternary copolymer, an epichlorohydrin-propylene oxide-allyl glycidyl ether ternary copolymer, or an epichlorohydrin-ethylene oxide-propylene oxide-allyl glycidyl ether quaternary copolymer, in particular, preferably an epichlorohydrin-ethylene oxide-allyl glycidyl ether ternary copolymer.

Vulcanizing Agent

In an embodiment of the invention, any vulcanizing agent capable of crosslinking the epihalohydrin-based copolymer (epihalohydrin-based rubber) may be used, examples of which include known vulcanizing agents serving to utilize the reactivity of chlorine atoms, such as a polyamine-based vulcanizing agent, a thiourea-based vulcanizing agent, a thiadiazole-based vulcanizing agent, a triazine-based vulcanizing agent, and a quinoxaline-based vulcanizing agent. A known vulcanizing agent serving to utilize the reactivity of the side-chain double bond, such as an organic peroxide or a sulfur-containing vulcanizing agent may also be appropriately used. In an embodiment of the invention, the vulcanizing agent is preferably at least one selected from a thiourea-based vulcanizing agent, a triazine-based vulcanizing agent, a quinoxaline-based vulcanizing agent, and a sulfur-containing vulcanizing agent. In view of ordinary physical properties, a thiourea-based vulcanizing agent, a triazine-based vulcanizing agent, and a quinoxaline-based vulcanizing agent are particularly preferred.

Examples of the polyamine-based vulcanizing agent include ethylenediamine, hexamethylenediamine, diethylenetriamine, triethylenetetramine, hexamethylenetetramine, p-phenylenediamine, cumenediamine, N,N'-dicinnamylidene-1,6-hexanediamine, ethylenediamine carbamate, and hexamethylenediamine dicarbamate. Examples of the thiourea-based vulcanizing agent include 2-mercaptoimidazoline, 1,3-diethylthiourea, 1,3-dibutylthiourea, and trimethylthiourea. Examples of the thiadiazole-based vulcanizing agent include 2,5-dimercapto-1,3,4-thiadiazole and 2-mercapto-1,3,4-thiadiazole-5-thiobenzoate. Examples of the triazine-based vulcanizing agent include 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine, and 1-phenylamino-3,5-dimercaptotriazine. Examples of the quinoxaline-based vulcanizing agent include 2,3-dimercaptoquinoxaline, quinoxaline-2,3-dithiocarbonate, 6-methylquinoxaline-2,3-dithiocarbonate, and 5,8-dimethylquinoxaline-2,3-dithiocarbonate. Examples of the organic peroxide include tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate. Examples of the sulfur-containing vulcanizing agent include sulfur and sulfur donating compounds. Examples of sulfur donating compounds include thiuram compounds such as tetramethylthiuram disulfide, tetraethylthiuram disulfide, tetrabutylthiuram disulfide, dipentamethylenethiuram disulfide, dipentamethylenethiuram hexasulfide; and morpholine polysulfides such as morpholine disulfide. In particular, the vulcanizing agent is preferably 2-mercaptoimidazoline, 6-methylquinoxaline-2,3-dithiocarbonate, or trimercapto-S-triazine. The vulcanizing agents may be used singly or in combination of two or more.

The content of the vulcanizing agent is preferably from 0.1 to 10 parts by weight, more preferably from 0.3 to 5 parts by weight, based on 100 parts by weight of the epihalohydrin-based copolymer. If the content is less than 0.1 parts by weight, vulcanization may be insufficient, and if the content is more than 10 parts by weight, vulcanization may proceed excessively, so that the resulting rubber material (vulcanized rubber) may be too stiff to attain the physical properties generally expected from the epihalohydrin-based copolymer (epichlorohydrin-based rubber).

Accelerator and Retarder

A known accelerator (namely, vulcanization accelerator), retarder or the like generally used together with these vulcanizing agents may be used in the vulcanizable rubber composition of the invention for use in an air spring.

Examples of the vulcanization accelerator include sulfur, thiuram sulfides, morpholine sulfides, amines, weak acid salts of amine, basic silica, quaternary ammonium salts, quaternary phosphonium salts, polyfunctional vinyl compounds, thiazoles, sulfenamides, dimethiocarbamates, mercaptoimidazolines, thiocarbamates, and carboxylates. More specifically, examples of the vulcanization accelerator include 1,8-diazabicyclo[5.4.0]undecene-7 (hereinafter abbreviated as DBU) salts, 1,5-diazabicyclo[4.3.0]nonene-5 (hereinafter abbreviated as DBN) salts, and white carbon. Examples of DBU salts include DBU-carbonate, UBU-stearate, DBU-2-ethylhexanoate, DBU-benzoate, DBU-salicylate, DBU-3-hydroxy-2-naphthoate, DBU-phenolic resin salt, DBU-2-mercaptobenzothiazole salt, and DBU-2-mercaptobenzimidazole salt. Examples of DBN salts include DBN-carbonate, DBN-stearate, DBN-2-ethylhexanoate, DBN-benzoate, DBN-salicylate, DBN-3-hydroxy-2-naphthoate, DBN-phenolic resin salt, DBN-2-mercaptobenzothiazole salt, and DBN-2-mercaptobenzimidazole salt. In particular, the vulcanization accelerator is preferably sodium stearate or the like.

Examples of the retarder include N-cyclohexanethiophthalimide, organozinc compounds, and acid silica.

The content of the vulcanization accelerator or the retarder is preferably from 0 to 10 parts by weight, more preferably from 0.1 to 5 parts by weight, based on 100 parts by weight of the epihalohydrin-based copolymer. It is not economical and therefore not preferred to increase the content to more than 10 parts by weight.

Plasticizer

In an embodiment of the invention, any commonly used plasticizer may be used. To improve the low-temperature properties, the plasticizer to be used preferably has a freezing point of $-40°$ C. or lower, more preferably $-50°$ C. or lower. Specifically, a phthalate-based plasticizer, an adipic acid ether ester-based plasticizer, a polyether ester-based plasticizer, or a polyether-based plasticizer may be conveniently used.

In an embodiment of the invention, the content of the plasticizer is preferably from 0.1 to 20 parts by weight, more preferably from 6 to 20 parts by weight, in particular, preferably from 11 to 20 parts by weight, based on 100 parts by weight of the epihalohydrin-based copolymer. If the content is out of the range, it may be undesirably difficult to knead the materials.

Acid Acceptor

While any known acid acceptor may be used depending on the vulcanizing agent in an embodiment of the invention, the acid acceptor is preferably a metal compound and/or an inorganic microporous crystal.

The metal compound may be an oxide, hydroxide, carbonate, carboxylate, silicate, borate, or phosphite of a metal in Group II (Group 2 and 12) of the periodic table; an oxide, hydroxide, carboxylate, silicate, sulfate, nitrate, or phosphate of a metal in Group III (Group 3 and 13) of the periodic table; or an oxide, basic carbonate, basic carboxylate, basic phosphite, basic sulfite, or tribasic sulfate of a metal in Group IV (Group 4 and 14) of the periodic table.

Specifically, examples of the metal compound include magnesia, magnesium hydroxide, aluminum hydroxide, barium hydroxide, magnesium carbonate, barium carbonate, calcined lime, slaked lime, calcium carbonate, calcium silicate, calcium stearate, zinc stearate, calcium phthalate, calcium phosphite, zinc white, tin oxide, litharge, red lead, white lead, dibasic lead phthalate, dibasic lead carbonate, tin stearate, basic lead phosphite, basic tin phosphite, basic lead sulfate, and tribasic lead sulfate.

The inorganic microporous crystal is a crystalline porous material, which is clearly distinguishable from amorphous porous materials such as silica gel and alumina. Examples of such an inorganic microporous crystal include zeolites, aluminophosphate molecular sieves, lamellar silicate, synthetic hydrotalcite, a Li—Al clathrate compound, and alkali metal titanate. Among these materials, the inorganic microporous crystal is more preferably at least one selected from the group consisting of synthetic hydrotalcite, a Li—Al clathrate compound, and synthetic zeolite as one of zeolites, in particular, preferably synthetic hydrotalcite.

Examples of the zeolites include natural zeolites, A-, X-, or Y-type synthetic zeolites, sodalites, natural or synthetic mordenites, ZSM-5, and metal-substituted derivatives thereof, and they may be used alone, or two or more kinds thereof may be used in combination. The metal of the metal-substituted derivative is generally sodium. The zeolite is preferably that having a high ability to accept acids, in particular, preferably synthetic zeolite, more preferably type A zeolite.

The synthetic hydrotalcite is represented by the following general formula (V):

$$Mg_xZn_yAl_z(OH)_{(2(x+y)+3z-2)}CO_3 \cdot wH_2O \quad (V)$$

wherein x and y are real numbers satisfying the relation of x+y=1 to 10, z is a real number of 1 to 5, and w is a real number of 0 to 10.

Examples of the hydrotalcites represented by the general formula (1) include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot 3.5H_2O$ and $Mg_3ZnAl_2(OH)_{12}CO_3$.

The Li—Al clathrate compound may be represented by formula (VI):

$$[Al_2Li(OH)_6]_n X \cdot mH_2O,$$

wherein X represents an inorganic or organic anion, n represents the valence of the anion X, and m represents an integer of 3 or less.

The content of the acid acceptor is preferably from 0.2 to 50 parts by weight, more preferably from 0.5 to 50 parts by weight, in particular, preferably from 1 to 20 parts by weight, based on 100 parts by weight of the epihalohydrin-based copolymer. If the content is less than 0.2 parts by weight, crosslinking may be insufficient, and if the content is more than 50 parts by weight, the vulcanized product may be too stiff to attain the generally expected physical properties.

Other Additives

Besides the above, the vulcanizable rubber composition of the invention for use in an air spring may contain any of various antioxidants, fillers, reinforcing materials, processing aids, pigments, and flame retardants, which are used in the art. A small amount of rubber or resin generally used in the art may also be blended into the composition as long as the properties according to the invention are not lost.

Method for Preparing Vulcanizable Rubber Composition for Use in Air Spring

The vulcanizable rubber composition of the invention for use in air spring may be prepared by a method using any conventional means used in the field of polymer processing, such as a mixing roll, a banbury mixer, or any of various kneaders and the like.

Method for Vulcanizing the Rubber Composition for Use in Air Spring

The rubber formed product of the invention for use in an air spring is generally obtained by heating the vulcanizable rubber composition for use in an air spring at 100 to 200° C., in which vulcanization is generally performed for 0.5 to 300 minutes depending on the temperature. The vulcanization and the forming may be performed using any appropriate method such as compression molding with dies, injection molding, or heating with an air bath, infrared rays, or microwaves.

EXAMPLES

The invention is more specifically described by the examples and the comparative examples below. It will be understood that the examples described below are not intended to limit the scope of the invention and may be modified without departing from the gist of the invention.

The materials for each composition shown in Table 1 were kneaded in a Banbury mixer at 120° C. so that each kneaded compound A was prepared. Each kneaded compound A was kneaded with the materials in an open roll so that each kneaded compound B was prepared. Table 2 below shows the ratio of the constituents in the copolymer used in each of the examples and the comparative examples.

The materials shown below were used in the preparation of the compositions in the examples and the comparative examples.

*1: EPICHLOMER C (ethylene oxide-epichlorohydrin binary copolymer) manufactured by DAISO CO., LTD.

*2: EPICHLOMER CG-102 (ethylene oxide-epichlorohydrin-allyl glycidyl ether ternary copolymer) manufactured by DAISO CO., LTD.

*3: EPICHLOMER DG (ethylene oxide-epichlorohydrin-allyl glycidyl ether ternary copolymer) manufactured by DAISO CO., LTD.

*4: Ethylene oxide-propylene oxide-epichlorohydrin-allyl glycidyl ether quaternary copolymer

*5: EPICHLOMER CG-104 (epichlorohydrin homopolymer) manufactured by DAISO CO., LTD.

*6: Ethylene oxide-epichlorohydrin-allyl glycidyl ether ternary copolymer

*7: Ethylene oxide-propylene oxide-epichlorohydrin-allyl glycidyl ether quaternary copolymer

*8: Neoprene WRT manufactured by DuPont

*9: ADK CIZER RS-705 (with a freezing point of −53° C.) manufactured by ADEKA CORPORATION

*10: Di-2-ethylhexyl phthalate (with a freezing point of −35° C.)

*11: SPLENDER R-300 (fatty acid ester) manufactured by Kao Corporation

*12: NOCRAC 300 manufactured by OUCHI SHINKO CHEMICAL INDUSTRIAL CO., LTD.

*13: NOCRAC PA manufactured by OUCHI SHINKO CHEMICAL INDUSTRIAL CO., LTD.

*14: Pentaerythritol manufactured by Nippon Synthetic Chemical Industry Co., Ltd.

*15: DHT-4A (synthetic hydrotalcite) manufactured by Kyowa Chemical Industry Co., Ltd.

*16: Kyowamag #150 (magnesium oxide) manufactured by Kyowa Chemical Industry Co., Ltd.

*17: Rhenogran NAST-50/ACM (GE1858) manufactured by Rheine Chemie Rheinau GmbH

*18: NOCCELER DM manufactured by OUCHI SHINKO CHEMICAL INDUSTRIAL CO., LTD.

*19: NOCCELER TS manufactured by OUCHI SHINKO CHEMICAL INDUSTRIAL CO., LTD.

*20: Accel 22 (ethylenethiourea) manufactured by Kawaguchi Chemical Industry Co., LTD.

TABLE 1

| Kneaded | Blended materials | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| A | EPICHLOMER C *1 | 100 | | | | | | | | |
| | EPICHLOMER CG-102 *2 | | 100 | | | | 100 | | | |
| | EPICHLOMER DG *3 | | | 100 | | | | | | |
| | EO-PO-EP-AGE quaternary copolymer *4 | | | | 100 | | | | | |
| | EPICHLOMER CG-104 *5 | | | | | 100 | | | | |
| | EO-PO-AEG ternary copolymer *6 | | | | | | | 100 | | |
| | EO-PO-EP-AGE quaternary copolymer *7 | | | | | | | | 100 | |
| | Neoprene WRT (chloroprene rubber) *8 | | | | | | | | | 100 |
| | HAF carbon (reinforcing agent) | 30 | 30 | 30 | 30 | 30 | 30 | 30 | 30 | |
| | FEF carbon (reinforcing agent) | | | | | | | | | 50 |
| | ADK CIZER RS-705 (plasticizer) *9 | 15 | 15 | 15 | 15 | 15 | 15 | 15 | 15 | |
| | DOP (plasticizer) *10 | | | | | | | | | 10 |
| | SPLENDER R-300 (processing aid) *11 | 1 | 1 | 1 | 1 | 1 | | 1 | 1 | |
| | Stearic acid (processing aid) | | | | | | 1 | | | 1 |
| | NOCRAC 300 (antioxidant) *12 | 1 | 1 | 1 | 1 | 1 | 1 | 1 | 1 | |
| | NOCRAC PA (antioxidant) *13 | | | | | | | | | 2 |
| | Pentaerythritol (vulcanization accelerator) *14 | 0.5 | 0.5 | 0.5 | 0.5 | 0.5 | | 0.5 | 0.5 | |
| | DHT-4A (acid acceptor) *15 | 4 | 4 | 4 | 4 | 4 | | 4 | 4 | |
| | MgO #150 (acid acceptor) *16 | | | | | | | | | 4 |
| | ZnO (vulcanization accelerator) | | | | | | 5 | | | 5 |
| B | Sodium stearate (vulcanization accelerator) *17 | 4 | 4 | 4 | 4 | 4 | | 4 | 4 | |
| | N-cyclohexylthiophthalimide (retarder) | 0.5 | 0.5 | 0.5 | 0.5 | 0.5 | | 0.5 | 0.5 | |
| | 6-methylquinoxaline-2,3-dithiocarbonate (vulcanizing agent) | 1.7 | 1.7 | 1.7 | 1.7 | 1.7 | | 1.7 | 1.7 | |
| | NOCCELER DM (vulcanization accelerator) *18 | | | | | | 1 | | | |
| | NOCCELER TS (vulcanization accelerator) *19 | | | | | | 0.5 | | | |
| | Sulfur (vulcanizing agent) | | | | | | 1 | | | |
| | Accel 22 (vulcanizing agent) *20 | | | | | | | | | 0.5 |

TABLE 2

| Composition of polymer (mol %) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Ethylene oxide | 51 | 56 | 59 | 15 | 34.5 | 56 | 75 | 65 | — |
| Propylene oxide | — | — | — | 40 | — | — | — | 15 | — |
| Epichlorohydrin | 49 | 40 | 37 | 40 | 63 | 40 | 20 | 15 | — |
| Allyl glycidyl ether | — | 4 | 4 | 5 | 2.5 | 4 | 5 | 5 | — |

Notes)
Ethylene oxide was used as a compound from which the constituent unit represented by formula (I) was derived, propylene oxide was used as a compound from which the constituent unit represented by formula (II) was derived, epichlorohydrin was used as a compound from which the constituent unit represented by formula (III) was derived, and allyl glycidyl ether was used as a compound from which the constituent unit represented by formula (IV) was derived.

Mooney Scorch Test

The measurement was performed using an L-type rotor (dia. 38.1 mm) according to JIS K 6300. In Table 3, Vm represents the minimum viscosity, and t5 represents the Mooney scorch time determined by the Mooney scorch test according to JIS K 6300.

Tensile Characteristics

Immediately after the kneading, a sheet of the kneaded compound B prepared as described above was placed in a die and subjected to press vulcanization at 170° C. for 15 minutes so that a rubber formed product (150 mm×150 mm×2 mm) for use in an air spring was obtained. The resulting vulcanized rubber formed product was formed into No. 3 dumbbell specimens according to JIS K 6251 by punching with a punch die, and the specimens were measured for tensile stress, tensile strength, and elongation at break according to JIS K 6251. In Table 3, M100, M300, TB, and EB represent the tensile stress at an elongation of 100%, the tensile stress at an elongation of 300%, the tensile strength, and the elongation at break, respectively, which were determined by the tensile test according to JIS K 6251.

Hardness

The hardness of the rubber formed product for use in an air spring (vulcanized rubber formed product) was measured according to JIS K 6253. The product having an A hardness of about 50 or less was determined to have low hardness (to be soft) and to meet the objects of the invention. In the Table, Hs means the hardness determined by the hardness test according to JIS K 6253.

Compression Set Test

The measurement was performed according to JIS K 6262. Specifically, a sheet of the kneaded compound B was subjected to press vulcanization at 170° C. for 20 minutes using a specimen-forming die so that cylindrical vulcanized rubber specimens (about 12.5 mm in thickness, about 29 mm in diameter) were obtained. The compression set was measured using the resulting rubber specimens.

Low-Temperature Impact Brittleness Test

The low-temperature behavior was measured by the low-temperature impact brittleness test according to JIS K 6261. Immediately after the kneading, a sheet of the kneaded compound B prepared as described above was placed in a die and subjected to press vulcanization at 170° C. for 15 minutes so that a vulcanized rubber formed product (150 mm×150 mm×2 mm) was obtained. The resulting vulcanized rubber formed product was formed into B-type specimens for the low-temperature impact brittleness test according to JIS K 6261 by punching with a punch die, and the specimens were measured for low-temperature behavior using methanol as a thermal medium according to JIS K 6261.

Ozone Resistance Test

The ozone resistance was measured by the dynamic ozone deterioration test according to JIS K 6259. Immediately after the kneading, a sheet of the kneaded compound B prepared as described above was placed in a die and subjected to press vulcanization at 170° C. for 15 minutes so that a vulcanized rubber formed product (150 mm×150 mm×2 mm) was obtained. The resulting vulcanized rubber formed product was formed into No. 1 dumbbell specimens according to JIS K 6251 by punching with a punch die, and the specimens were measured for dynamic ozone-exposure behavior. The dynamic ozone deterioration test was performed under the conditions of an ozone concentration of 50 pphm, a temperature of 40° C., and a specimen elongation of 0 to 30%. The symbols for the ozone test means the cracked states shown below according to JIS K 6259.

N-C: There are no cracks.
A-1: There are a small number of cracks not visible but identifiable with a 10× magnifier.
C-4: There are an infinite number of relatively large, deep cracks (from 1 mm to less than 3 mm).

Flex Fatigue Resistance Test

The resistance to flex fatigue was measured by the Mattia flex cracking test according to JIS K 6260. Specifically, a sheet of the kneaded compound B prepared as described above was subjected to press vulcanization at 170° C. for 15 minutes using a Mattia specimen-forming die so that vulcanized rubber specimens were formed, which were used in the measurement.

Table 3 shows the results obtained by each test of the examples and the comparative examples.

TABLE 3

| Tests and results | | Example | | | | | | Comparative Example | | |
|---|---|---|---|---|---|---|---|---|---|---|
| | | 1 | 2 | 3 | 4 | 5 | 6 | 1 | 2 | 3 |
| Mooney scorch test | Vm | 31 | 30 | 30 | 32 | 32 | 33 | 29 | 30 | 89 |
| | t5 (min.) | 7.9 | 8.6 | 10.1 | 9.6 | 8.1 | 22 | 15.2 | 16.5 | 5.3 |
| Ordinary physical properties | M100 (Mpa) | 1.3 | 1.2 | 1.1 | 1.1 | 1.3 | 1.2 | 1.3 | 1.3 | 4.2 |
| | M300 (Mpa) | 3.9 | 3.7 | 3.3 | 3.6 | 4 | 3.3 | 4 | 4 | 16.7 |
| | TB (Mpa) | 16.1 | 15.8 | 15 | 16.2 | 16.2 | 15.7 | 16.2 | 16.2 | 19.7 |
| | EB (%) | 850 | 865 | 895 | 910 | 830 | 920 | 830 | 830 | 365 |
| | Hs (Shore A) | 50 | 50 | 50 | 49 | 50 | 51 | 50 | 50 | 72 |
| | Compression set (%) | 9 | 10 | 12 | 11 | 9 | 40 | 9 | 9 | 32 |
| Low-temperature behavior | Brittle temperature (° C.) | −50 | −54 | −55 | −55 | −45 | −53 | −56 | −57 | −39 |
| Ozone resistance test | 168 hr. | A-1 | N.C. | N.C. | N.C. | N.C. | N.C. | N.C. | N.C. | C-4 |
| Flex fatigue resistance test | Number of flexing times (×10,000) | 101 | 105 | 107 | 102 | 98 | 120 | 21 | 26 | 170 |

As is evident from the results in Table 3, Examples 1 to 6 demonstrate that when the content of the constituent unit derived from ethylene oxide and/or propylene oxide was in the specified range, excellent low-temperature behavior and excellent resistance to flex fatigue were obtained. In contrast, Comparative Examples 1 and 2 demonstrate that when the content was out of the specified range, low resistance to flex fatigue was obtained.

A comparison between Examples 1 to 6 and Comparative Example 3 where chloroprene rubber (conventionally used in vulcanizable rubber compositions for air springs) was used shows that Examples 1 to 6 are superior in low-temperature behavior and ozone resistance.

INDUSTRIAL APPLICABILITY

The rubber formed product obtained by vulcanization of the vulcanizable rubber composition of the invention for use in an air spring not only has resistance to flex fatigue and ozone resistance but also excellent low-temperature properties. Therefore, it is highly suitable for use in wide applications such as air suspensions for railway vehicles, a variety of industrial equipment, and automobiles (such as cars, trucks, and buses).

The invention claimed is:

1. A vulcanizable rubber composition for use in an air spring, comprising: an epihalohydrin-based copolymer comprising 50 to 70 mol % of a constituent unit represented by formula (I):

and/or formula (II):

20 to 50 mol % of a constituent unit represented by formula (III):

wherein X represents a halogen atom selected from chlorine, bromine, and iodine, and 0 to 15 mol % of a constituent unit represented by formula (IV):

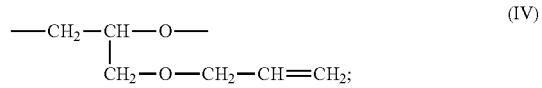

a vulcanizing agent;
a plasticizer having a freezing point of −40° C. or lower; and an acid acceptor.

2. The vulcanizable rubber composition according to claim 1, wherein the vulcanizing agent is at least one selected from the group consisting of a triazine-based vulcanizing agent, a quinoxaline-based vulcanizing agent, a thiourea-based vulcanizing agent, and a sulfur-containing vulcanizing agent.

3. The vulcanizable rubber composition according to claim 2, wherein the quinoxaline-based vulcanizing agent is 6-methylquinoxaline-2,3-dithiocarbonate.

4. The vulcanizable rubber composition according to claim 1, wherein the acid acceptor is a metal compound and/or an inorganic microporous crystal.

5. The vulcanizable rubber composition according to claim 4, wherein the inorganic microporous crystal is at least one selected from the group consisting of synthetic hydrotalcite, a Li—Al clathrate compound, and synthetic zeolite.

6. A rubber formed product for use in an air spring, comprising a vulcanization product of the rubber composition according to claim 1.

* * * * *